US008355671B2

(12) United States Patent
Kramer et al.

(10) Patent No.: US 8,355,671 B2
(45) Date of Patent: Jan. 15, 2013

(54) METHOD AND APPARATUS FOR TRANSPORTING VIDEO SIGNAL OVER BLUETOOTH WIRELESS INTERFACE

(75) Inventors: Mark Kramer, Castle Rock, CO (US); John M. Sample, Glendale, CO (US); Wilfred I. Tucker, Centennial, CO (US); Jeffrey J. Jacobsen, Hollister, CA (US)

(73) Assignee: Kopin Corporation, Taunton, MA (US)

( * ) Notice: Subject to any disclaimer, the term of this patent is extended or adjusted under 35 U.S.C. 154(b) by 997 days.

(21) Appl. No.: 12/348,627

(22) Filed: Jan. 5, 2009

(65) Prior Publication Data
US 2009/0209205 A1  Aug. 20, 2009

Related U.S. Application Data

(63) Continuation-in-part of application No. 12/152,462, filed on May 14, 2008.

(60) Provisional application No. 61/010,177, filed on Jan. 4, 2008.

(51) Int. Cl.
H04B 7/00 (2006.01)
(52) U.S. Cl. ....... 455/41.2; 455/3.06; 455/566; 345/204
(58) Field of Classification Search .................. 455/41.2, 455/3.06, 566, 575.6, 100; 345/204; 705/14.1; 358/1.15
See application file for complete search history.

(56) References Cited

U.S. PATENT DOCUMENTS

| 5,990,793 A | 11/1999 | Bieback |
| 6,010,216 A | 1/2000 | Jesiek |
| 6,073,034 A | 6/2000 | Jacobsen et al. |
| 6,108,197 A | 8/2000 | Janik |
| 6,204,974 B1 | 3/2001 | Spitzer |
| 6,325,507 B1 | 12/2001 | Jannard et al. |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |

(Continued)

FOREIGN PATENT DOCUMENTS
WO  WO 95/21408  8/1995
(Continued)

OTHER PUBLICATIONS

Notification of Transmittal of the International Search Report and the Written Opinion of the International Searching Authority, or the Declaration, International Application No. PCT/US08/06147, 10 pages, mailed Jul. 16, 2008.

(Continued)

*Primary Examiner* — Minh D Dao
(74) *Attorney, Agent, or Firm* — Hamilton, Brook, Smith & Reynolds, P.C.

(57) ABSTRACT

A wireless wearable video headset device useful for viewing and listening to multimedia content. In one embodiment, the device operates by receiving a digital encoded audio/video signal from a host device of a Bluetooth™ wireless connection, the Bluetooth™ connection established via a Serial Port Profile (SPP), and the digital video signal having been previously compressed with Windows Media Video (WMV) or H.264 compliant compression. The received digital audio/video signal is then forwarded over a Universal Serial Bus (USB) connection to an internal processor which then decompressed video content in the digital video signal to generate a component video signal that is suitable for handling by a display driver.

30 Claims, 4 Drawing Sheets

U.S. PATENT DOCUMENTS

| | | | | |
|---|---|---|---|---|
| 6,966,647 | B2 | 11/2005 | Jannard et al. | |
| 7,004,582 | B2 | 2/2006 | Jannard et al. | |
| 7,013,009 | B2 | 3/2006 | Warren | |
| 7,068,258 | B2 | 6/2006 | Cone et al. | |
| 7,082,393 | B2 | 7/2006 | Lahr | |
| 7,088,234 | B2 | 8/2006 | Naito et al. | |
| 7,147,324 | B2 | 12/2006 | Jannard et al. | |
| 7,150,526 | B2 | 12/2006 | Jannard et al. | |
| 7,158,096 | B1 | 1/2007 | Spitzer | |
| 7,213,917 | B2 | 5/2007 | Jannard et al. | |
| 7,216,973 | B2 | 5/2007 | Jannard et al. | |
| 7,219,994 | B2 | 5/2007 | Jannard et al. | |
| 7,231,038 | B2 | 6/2007 | Warren | |
| 7,249,846 | B2 | 7/2007 | Grand et al. | |
| 7,278,734 | B2 * | 10/2007 | Jannard et al. | 351/158 |
| 7,280,096 | B2 | 10/2007 | Marvit | |
| 7,312,981 | B2 | 12/2007 | Carroll | |
| 7,325,065 | B1 | 1/2008 | Watkins | |
| 7,331,666 | B2 | 2/2008 | Swab et al. | |
| 7,445,332 | B2 | 11/2008 | Jannard et al. | |
| 7,452,073 | B2 | 11/2008 | Jannard et al. | |
| 7,458,682 | B1 | 12/2008 | Lee | |
| 7,461,936 | B2 | 12/2008 | Jannard | |
| 7,494,216 | B2 | 2/2009 | Jannard et al. | |
| 7,512,414 | B2 * | 3/2009 | Jannard et al. | 455/556.1 |
| 7,620,432 | B2 | 11/2009 | Willins et al. | |
| 7,682,018 | B2 | 3/2010 | Jannard | |
| 7,740,353 | B2 | 6/2010 | Jannard | |
| 7,744,213 | B2 | 6/2010 | Jannard et al. | |
| 7,753,520 | B2 | 7/2010 | Fuziak, Jr. | |
| 7,760,898 | B2 | 7/2010 | Howell et al. | |
| 7,798,638 | B2 | 9/2010 | Fuziak, Jr. | |
| 7,806,525 | B2 | 10/2010 | Howell et al. | |
| 7,917,608 | B2 * | 3/2011 | Tsunoda et al. | 709/223 |
| 7,918,556 | B2 | 4/2011 | Lewis | |
| 7,959,084 | B2 | 6/2011 | Wulff | |
| 7,966,189 | B2 | 6/2011 | Le et al. | |
| 7,967,433 | B2 | 6/2011 | Jannard et al. | |
| 7,969,383 | B2 | 6/2011 | Eberl et al. | |
| 7,969,657 | B2 | 6/2011 | Cakmakci et al. | |
| 7,976,480 | B2 | 7/2011 | Grajales et al. | |
| 7,988,283 | B2 | 8/2011 | Jannard | |
| 8,010,156 | B2 | 8/2011 | Warren | |
| 8,020,989 | B2 | 9/2011 | Jannard et al. | |
| 8,025,398 | B2 | 9/2011 | Jannard | |
| 8,060,014 | B2 * | 11/2011 | Ueda et al. | 455/41.2 |
| 8,072,393 | B2 | 12/2011 | Riechel | |
| 8,098,439 | B2 | 1/2012 | Amitai et al. | |
| 8,140,197 | B2 | 3/2012 | Lapidot et al. | |
| 8,164,773 | B2 * | 4/2012 | Montierth et al. | 358/1.15 |
| 8,212,859 | B2 | 7/2012 | Tang et al. | |
| 2001/0034250 | A1 | 10/2001 | Chadha | |
| 2002/0015008 | A1 | 2/2002 | Kishida et al. | |
| 2002/0030649 | A1 | 3/2002 | Zavracky et al. | |
| 2002/0094845 | A1 | 7/2002 | Inasaka | |
| 2002/0158812 | A1 | 10/2002 | Pallakoff | |
| 2003/0017846 | A1 | 1/2003 | Estevez et al. | |
| 2003/0051083 | A1 | 3/2003 | Striemer | |
| 2003/0068057 | A1 | 4/2003 | Miller et al. | |
| 2004/0229658 | A1 | 11/2004 | Kim et al. | |
| 2005/0125840 | A1 | 6/2005 | Anderson et al. | |
| 2005/0201585 | A1 * | 9/2005 | Jannard et al. | 381/381 |
| 2005/0212749 | A1 | 9/2005 | Marvit et al. | |
| 2005/0264527 | A1 | 12/2005 | Lin | |
| 2005/0286466 | A1 * | 12/2005 | Tagg et al. | 370/329 |
| 2006/0105806 | A1 | 5/2006 | Vance et al. | |
| 2006/0132382 | A1 | 6/2006 | Jannard | |
| 2006/0212611 | A1 | 9/2006 | Fujii et al. | |
| 2007/0038735 | A1 * | 2/2007 | Tsunoda et al. | 709/223 |
| 2007/0153374 | A1 | 7/2007 | Travers | |
| 2007/0171921 | A1 | 7/2007 | Wookey et al. | |
| 2007/0247449 | A1 * | 10/2007 | Mack et al. | 345/204 |
| 2007/0260905 | A1 | 11/2007 | Marsden et al. | |
| 2007/0297005 | A1 * | 12/2007 | Montierth et al. | 358/1.15 |
| 2008/0021777 | A1 * | 1/2008 | Mack et al. | 705/14 |
| 2008/0089545 | A1 * | 4/2008 | Jannard et al. | 381/374 |
| 2008/0171561 | A1 * | 7/2008 | Irony et al. | 455/466 |
| 2008/0198324 | A1 | 8/2008 | Fuziak | |
| 2008/0270625 | A1 | 10/2008 | Chaturvedi et al. | |
| 2008/0291277 | A1 | 11/2008 | Jacobsen et al. | |
| 2009/0023395 | A1 * | 1/2009 | Chang et al. | 455/74.1 |
| 2009/0099836 | A1 * | 4/2009 | Jacobsen et al. | 704/3 |
| 2009/0109054 | A1 * | 4/2009 | Ueda et al. | 340/825.72 |
| 2009/0128448 | A1 | 5/2009 | Riechel | |
| 2009/0154719 | A1 | 6/2009 | Wulff et al. | |
| 2009/0160735 | A1 * | 6/2009 | Mack | 345/2.3 |
| 2009/0180195 | A1 | 7/2009 | Cakmakci et al. | |
| 2009/0209205 | A1 * | 8/2009 | Kramer et al. | 455/41.3 |
| 2009/0251409 | A1 | 10/2009 | Parkinson et al. | |
| 2010/0020229 | A1 | 1/2010 | Hershey et al. | |
| 2010/0033830 | A1 | 2/2010 | Yung | |
| 2010/0053069 | A1 | 3/2010 | Tricoukes et al. | |
| 2010/0121480 | A1 | 5/2010 | Stelzer | |
| 2010/0171680 | A1 | 7/2010 | Lapidot et al. | |
| 2010/0271587 | A1 | 10/2010 | Pavlopoulos | |
| 2010/0273417 | A1 * | 10/2010 | Tian et al. | 455/41.2 |
| 2010/0289817 | A1 | 11/2010 | Meier et al. | |
| 2011/0001699 | A1 * | 1/2011 | Jacobsen et al. | 345/157 |
| 2011/0084900 | A1 * | 4/2011 | Jacobsen et al. | 345/156 |
| 2011/0187640 | A1 * | 8/2011 | Jacobsen et al. | 345/156 |
| 2011/0194029 | A1 * | 8/2011 | Herrmann et al. | 348/569 |
| 2011/0254698 | A1 | 10/2011 | Eberl et al. | |
| 2011/0255050 | A1 | 10/2011 | Jannard et al. | |
| 2012/0013843 | A1 | 1/2012 | Jannard | |
| 2012/0105740 | A1 | 5/2012 | Jannard et al. | |

FOREIGN PATENT DOCUMENTS

| | | |
|---|---|---|
| WO | WO 95/23994 | 9/1995 |
| WO | WO 00/79327 | 12/2000 |
| WO | WO 2009/076016 | 6/2009 |
| WO | WO 2012/040386 | 3/2012 |

OTHER PUBLICATIONS

Notification of Transmittal of International Preliminary Report on Patentability, International Application No. PCT/US 08/06147, 5 pages, mailed on Apr. 28, 2011.

* cited by examiner

METHOD AND APPARATUS FOR TRANSPORTING VIDEO SIGNAL OVER BLUETOOTH WIRELESS INTERFACE

RELATED APPLICATION(S)

This application claims the benefit of U.S. Provisional Application No. 61/010,177, filed on Jan. 4, 2008 and is a continuation-in-part of U.S. application Ser. No. 12/152,462, filed on May 14, 2008. The entire teachings of the above application(s) are incorporated herein by reference.

BACKGROUND OF THE INVENTION

Recent technology convergence between mobile phones and digital media players, such as with the iPhone™, are increasingly placing in the hands of consumers small, portable devices capable of storing large amounts of video content. While these handheld devices typically include a video screen, the visual experience of a high resolution, large format display can never be replicated in such a device simply because of the physical size limitations expected of a hand held device. As a result, consumers are now seeking high-quality, portable, color displays to augment their handheld video devices. One such display is worn on the user's face or head similar to a pair of eyeglasses or headphones. Through recent dramatic developments in optical technologies, these devices can provide the appearance of a large format, high resolution display.

One example of such a device is found in U.S. Pat. No. 7,088,234 issued to Naito, et al. and assigned to Matsushita Electrical Industries. The wearable information device described in that patent can display certain information to notify the user (e.g., information about arrival of an e-mail).

Another such device is described in U.S. Pat. No. 7,158, 096 issued to Spitzer and assigned to MyVu Corporation. That device includes a projection type display attached to one end of a head-mountable support. An eyepiece assembly is attached to a second end of the support. The support maintains the projection system and the eyepiece assembly in alignment along an optical path.

A further device is described in U.S. patent application Ser. No. 12/152,462 by Jacobsen, et al. and assigned to Kopin Corporation, the teachings of which are incorporated by reference.

SUMMARY OF THE INVENTION

In most prior art arrangements, a video headset is connected to a base electronics unit by means of a wire. While this provides a secure communication link with sufficient bandwidth to transport a high quality video signal, the need for a wire limits the mobility of the user. The wire is also inconvenient for the purpose of storage.

A wireless headset, on the other hand, provides greater convenience and mobility and avoids problems, such as broken connecting wires. More particularly, a head mounted display according to an embodiment of the present invention can be configured as a pair of eyeglasses and/or equipped with a set of speakers and/or boom microphone. The display in such a device can include one or more high resolution, Liquid Crystal Display (LCD) panels that can be positioned in front of the viewer's eye(s). The panel(s) can be opaque and/or transparent and/or may be incorporated with normal eyeglass lenses. The panels can comprise all of the lens, only half the lens in a bifocal arrangement, or can be superimposed over a conventionally appearing eyeglass lens.

A wireless communications controller associated with the headset acts as a video link to a host device. The host is any appropriate device that sources video information, such as a cell phone, personal computer (PC), laptop, media player and/or the like. Switches associated with or voice commands received at the device can allow the user to select and navigate menus, play media files, set volume and screen brightness, activate controls for the host target device or perform other commands.

The wireless link must support transmission of video. There has been an assumption in the prior art that quality video requires at least a Video Graphic Array (VGA) type resolution of 640×480 pixels, at a frame rate of at least 30 frames per second (fps). To accomplish this, a connection supporting an apparent ten megabits per second (Mbps) data rate has typically been required. The use of video compression algorithms, such as those specified by the Motion Picture Expert Group (MPEG)-3 or -4 have been used to reduce data rates.

One could consider using various existing wireless networking technologies to provide a physical layer connection between the headset and the controller. These could include the various Institute of Electrical and Electronic Engineers (IEEE)802.11 (WiFi™) standards. A current release, 802.11 (g), does provide sufficient bandwidth at the physical layer for transporting VGA quality, MPEG compressed signals. However, adoption of WiFi™ would also require at least two protocol layers higher than a link layer (e.g., at least a transport and network layer), such as Transmission Control Protocol (TCP)/Internet Protocol (IP) (TCP/IP). With this approach, a still higher layer protocol, such as Realtime Transfer Protocol (RTP), would also typically be needed to handle packet synchronization and other functions.

However, example embodiments of the present invention use a Bluetooth™ wireless physical layer. Bluetooth™ has become the most widely-adopted way to interface portable handheld devices to other equipment. Bluetooth™ also offers broader compatibility, lower power consumption, and other advantages over WiFi™. Conversely, Bluetooth™ specifies somewhat lower data rates than WiFi™ which, in a so-called "basic mode", are not necessarily sufficient to support VGA quality video.

Although various video modes are already built into Bluetooth™, these modes alone are not sufficient for handling VGA or better quality video given their overhead data rates.

For example, the most recent Bluetooth™ specification includes an Enhanced Data Rate (EDR) mode that provides higher physical layer bandwidth that the basic mode. But even the EDR mode of Bluetooth™ does not support processing of a raw video signal with the better known compression algorithms, such as in the preferred embodiments, including the Windows Media Video (WMV) and Motion Picture Experts Group (MPEG)-4 part 10 (H.264) standards. A protocol supporting such compression standards over Bluetooth™ would allow for streaming video at 30 frames per second at National Television System Committee (NTSC) Digital Versatile Disc (DVD) quality (i.e., at least 720×480 resolution).

In addition, a primary concern is transport speed and that all IP layers that might be needed for a generic data connection need may not be provided. Bluetooth™'s inherent EDR mode has guaranteed sequence packet delivery built into its lower protocol layers. Since there is only a need to support a point-to-point connection (i.e., between the headset and the host video source), certain protocol layers can advantageously be stripped out, relying instead on a high-speed serial port interface mode (i.e., Serial Port Profile (SPP)) for packet delivery.

Furthermore, internal high speed interface connections within the controller, such as Serial Peripheral Interface (SPI), universal asynchronous receiver/transmitter (UART) and Universal Serial Bus (USB), can help avoid bottlenecks for data streaming and optimize performance through setting buffer sizes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
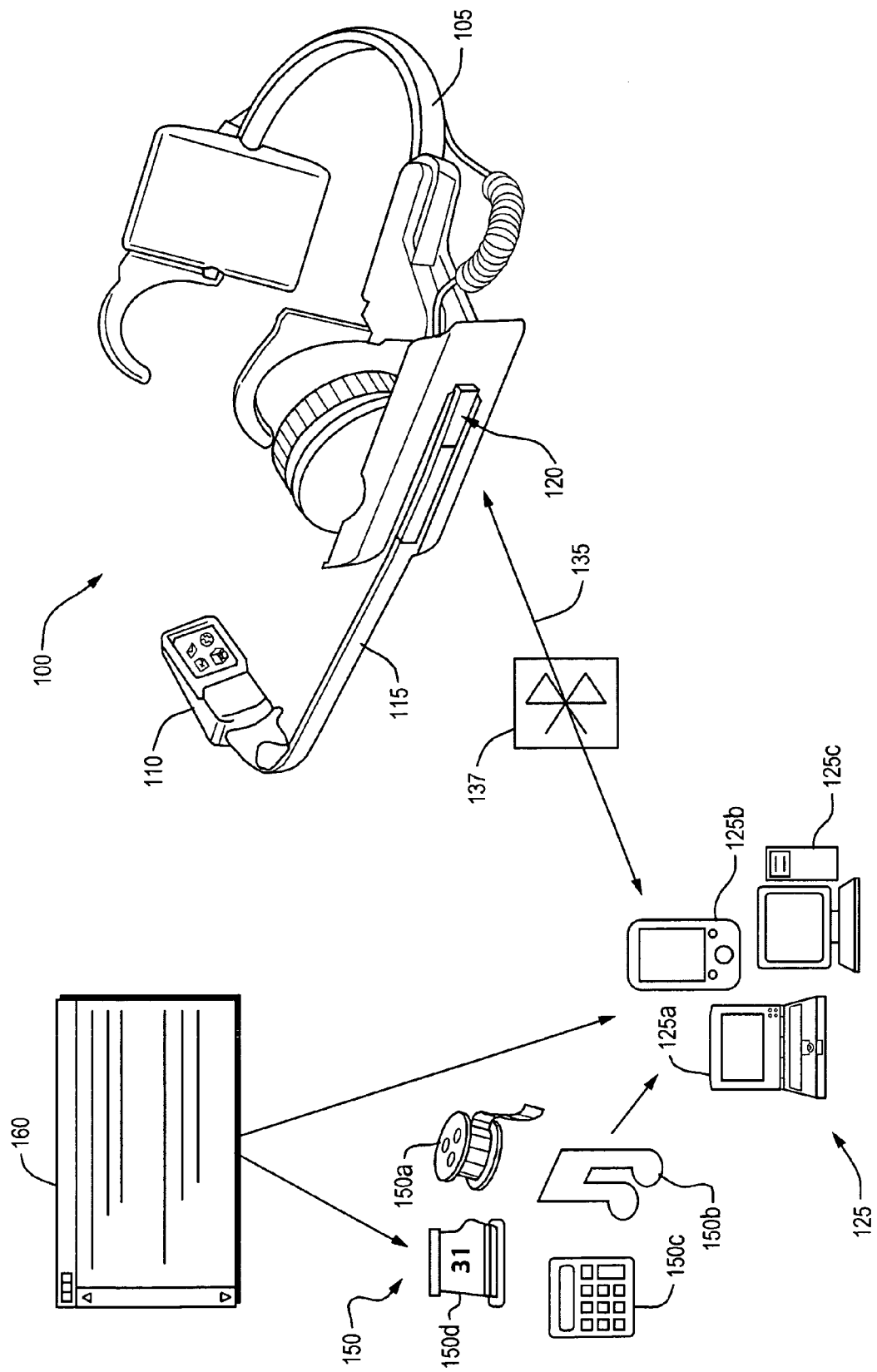
FIG. 1 is a diagram illustrating a perspective view of an example embodiment monocular display device that may employ example embodiments of the present invention, and wireless communications between the example embodiment display device and host computing devices.

FIG. 1 is a diagram of a display device 100, including a display panel 110. In one embodiment, the display device may be a monocular display device. In such an embodiment, display panel 110 may be mounted to a housing 102 via an adjustable arm 115 and incorporate a headset and earpiece 108. In another embodiment, the display panel 110 may be a handheld microdisplay. More details of the such a monocular display device 100 are provided in U.S. patent application Ser. No. 12/008,114 entitled "Monocular Display Device", filed Jan. 8, 2008.

The example display device 100, preferably, can establish a two-way or bidirectional wireless communication link 135 with a host computing device 125. Thereafter, the device 100 can send and receive data from and to the host device 125 across the wireless link 135 with a high data transfer rate. The display device 100 can convert the received data across the wireless link to multimedia including graphical video data to display images on the display panel 110, which may originate from the host computing device 125 or, alternatively, from another remove database or source, such as a remote memory.

In one embodiment, the wireless communication link 135 uses short range or long range radiofrequency signals over a designated channel to communicate data between devices 100, 125 in a protocol that is known by both devices 100, 125. Preferably, the radiofrequency signals are low power (e.g., in a range of about 1.0 mWatt to 100 mWatts) so as to transmit the radio frequency signals across a desired distance, which can be from several feet or greater than twenty feet in length.

In one embodiment, the display device 100 uses a Bluetooth™ 137 communication standard to communicate with the host computing device 125. In one embodiment, the Bluetooth™ connection permits data communication at a data transfer rate of around 1 Mbps with another computing device about 10 meters away using a 2.4 Gigahertz (GHz) frequency.

In another embodiment, the wireless communication link 135 may use Institute of Electrical and Electronics Engineers (IEEE) 802.11(b), IEEE 802.11(g), or other standard. In yet another embodiment, the wireless communication link 135 may include Bluetooth™ 3.0 with a data transfer rate of about 480 Mbps, Ultra-wideband (UWB), Wireless Universal Serial Bus (USB)™, WirelessHD™, Wireless High Definition Multimedia Interface (Wireless HDMI™), WiFi, or any other high speed digital communication standard known in the art. In a further alternative embodiment, the display device 100 may communicate with the host computing system 125 using a wired connection, instead of link 135 such as, for example, a serial port, or a USB cable, or other wired connections. Alternatively, the wireless communication link 135 may include a Code Division Multiple Access (CDMA) standard, a Time Division Multiple Access (TDMA) standard, or Frequency Division Multiple Access (FDMA) standard or, alternatively, any other frequency hopping standard in spread spectrum communication known in the art to communicate data. Various protocol standards for wired and wireless communication are known in the art, and the present device 100 is not limited to any specific link, or radio frequency protocol.

The present display device 100 uses the two-way or bidirectional wireless communication link 135 with the computing device 125 to playback video and audio on the display panel 110. The display device 100 also controls the host computing device 125, such as, for example, a wireless laptop 125a, to run business applications, retrieve e-mail, and run executable code, and applications from the laptop 125a across the wireless link 135. In this regard, the display device 100 may include an input device 120 (e.g., input device 335 of FIG. 3) that can transmit a wireless input signal to the host computing device 125. The input signal can control the host computing device 125 to provide control signals to run applications on the host computing device 125. Thereafter, the host computing device 125 outputs a graphical output to the display 110 for a remote display of applications operating at the host computing device 125 at the display device 100, which may be located a distance away from the host computing device 125. Hosts 125 source content 150 of various types for viewing on the display panel 110, including video 150a, audio 150b, computer data 150c, and other types of information, such as calendar 150d, email and any number of types of data that would regularly be found from hosts 125.

It should be appreciated that the display device 100 is not limited to using any specific host computing device 125, and it should be appreciated that the discussion with regard to the laptop computer 125 is merely illustrative and is not limiting. The present display device 100 may, instead, communicate with other mobile portable devices or informational databases, such as, for example, a cell phone, Personal Digital Assistant (PDA), such as a PALM™ compatible device, desktop computer, tablet computer, mobile e-mail communication device, such as, for example, a Blackberry™ device or a Good Technology™ compatible device, or personal digital music or video player, such as, for example, an Apple iPod™ video and audio player, Microsoft Zune™ multimedia players, and other Motion Picture Experts Group (MPEG)-1 Audio Layer 3 (MP3) music players, digital video players, or drives. The host computing devices 125 also can include automotive systems, Global Position System (GPS) devices, satellite radio and terrestrial digital radio receivers or players, such as, for example, XM Satellite Radio™, Sirius Satellite Radio™ or HD Radio™ compatible devices. The host computing devices 125 can also include mainframe computing devices, digital testing devices, diagnostic equipment, a TiVO™ or other digital video recorder, a set top cable box, or any other digital or analog device known in the art.

The host computing device 125 may communicate with remote databases, and may act as an intermediary between the display device 100 and a source of multimedia content, or site, so that the user can view multimedia (in the peripheral vision of the wearer) without the associated heavy computing device and network connections associated with obtaining the multimedia content. The display device 100 may be very lightweight, in the order of a few ounces, and supported by the wearer so the wearer can move in an obstructed manner to engage in normal day-to-day activities.

The host computing device 125 may be a personal computing device, such as, for example, a desktop or laptop computer that includes an operating system (OS), such as, for example, the Microsoft Windows Vista™, Microsoft Windows Mobile™, Apple Mac OSX™, Symbian™ compatible operating systems, Lenovo compatible operating systems, the Linux operating system, the UNIX operating system or another known suitable operating system that is Internet ready, and configured for wireless mobile operation.

Figure 2:
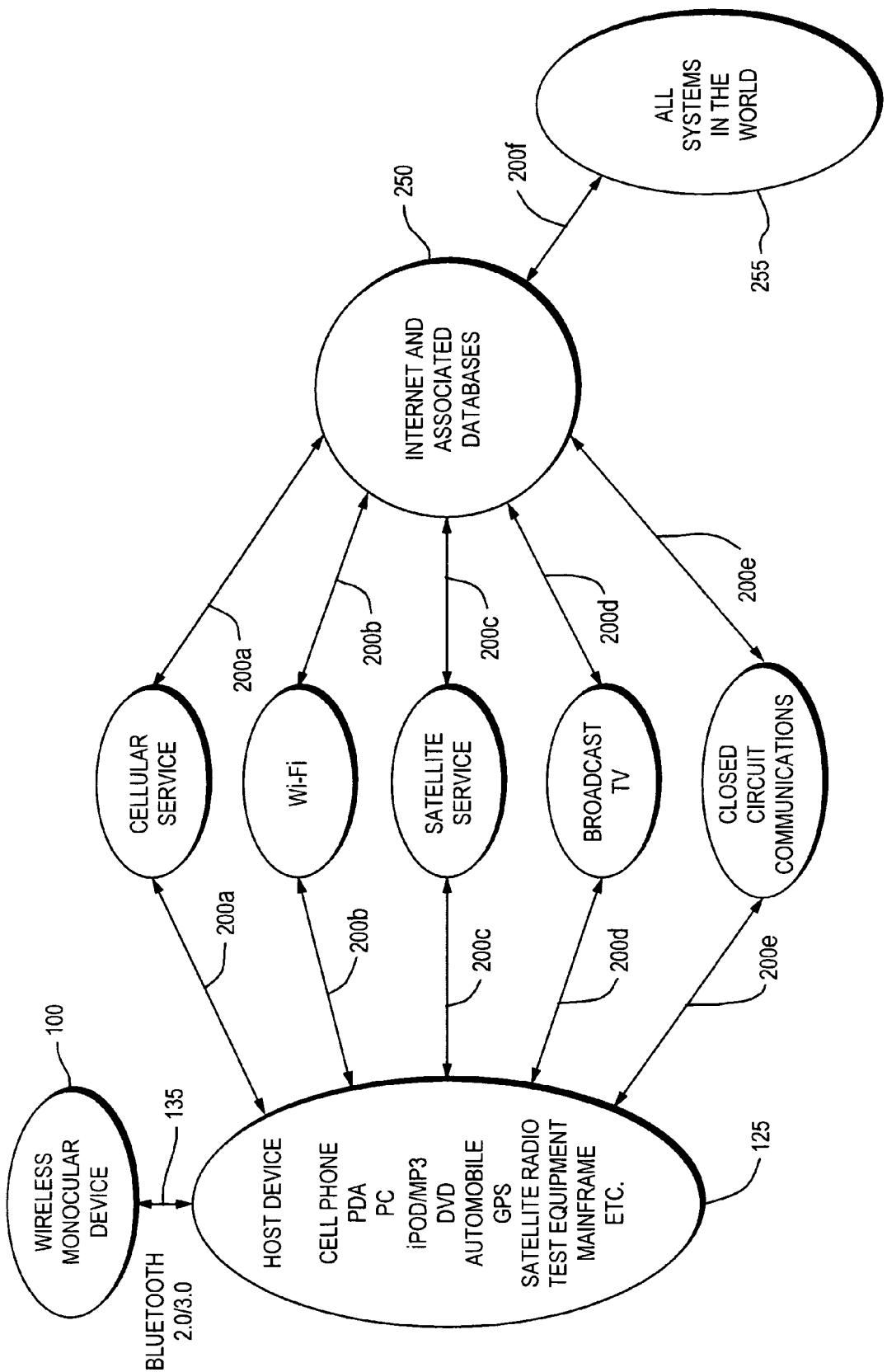
FIG. 2 is a network diagram illustrating communications between an example embodiment display device and host computing devices, and communications between the host computing devices and other external databases and the Internet for delivery of multimedia content to the monocular display device.

FIG. 2 is a diagram illustrating an example embodiment display device 100 interacting with a host computing device 125. The host computing device 125 obtains information along a bi-directional communication path(s) such as cellular service 200a, WiFi™ 200b, satellite service 200c, broadcast television 200d, and closed circuit communications 200e to the Internet 250 or associated databases 255 for which to display content on the display panel 110 of the display device 100.

In one embodiment, the communication path 200a may be a cellular mobile communication wireless path, and each path may be different or the same relative to the remaining bidirectional communication paths 200b-200e. In one embodiment, the host computing device 125 may obtain information using Sprint™ EV-DO Wireless Broadband Connection, and then communicate with the display device 100 using a Bluetooth™ wireless connection 135.

In another embodiment, the communication path 200b may be a WiFi™ communication path or similar radiofrequency signal communication link. The host computing device 125 may communicate with satellite services providers, digital video recorders, broadcast television providers, or closed circuit communication devices using respective paths 200c, 200d, 200e. Paths 200a-200e may also be associated with a public access wireless hot spot.

It is appreciated that the present display device 100 may be compatible with NASCAR™ Nextel Fan View™ to watch closed circuit television of sporting events, and/or Kangaroo TV™ broadcast devices for displaying closed circuit television events. The present display device 100 may be configured to receive live broadcasts, can receive multiple different broadcast views of sporting events in real time (of the same or different events), statistical information, and audio data.

The host computing device 125 may access a World Wide Web (WWW) server on the Internet 300 along paths 200a, 200b, and obtain information, which is held and displayed to the display panel 110 along communication link 135. In one embodiment, the data can be in a known data format such as, for example, Hyper Text Markup Language (HTML), Extensible Markup Language (XML), Joint Photographic Experts Group (JPEG), Waveform (WAV), Audio Interchange File Format (AIFF), Bitmap (BMP), Picture (PICT), Graphic Interchange Format (GIF), and Windows Media Video (WMV), or any other data format suitable for multimedia content including streaming video, and audio. The data can be obtained from the Internet from databases 305 along path 200f. Various communication path configurations are possible and within the scope of the present disclosure.

The host computing device 125 can send and receive data along a wireless communication path 200b to the Internet and other system web pages or information databases 300 using HTML along bidirectional communication path 200b. The host computing device 125 may include Internet browsing software (such as know web browsers including, Microsoft Internet Explorer™, Opera™, Netscape Navigator™, and Mozilla Firefox™) to send and receive data along paths 200a and 200b. It should be appreciated that the host computing device 125 may be connected to the Internet by a cellular telephone network, and/or an Internet Service Provider Gateway Server.

Moreover, the present display device 100 may be configured to receive push e-mail, pull e-mail or periodically forwarded e-mail from e-mail accounts, such as, for example MSN™ Hotmail™, Google™ Gmail™, Yahoo!™ mail, AOL™ Mail, or any other e-mail provider or Internet site known in the art along path(s) 200a through 200e. In one embodiment, the wireless link 135, or communication paths 200a through 200e, may be compatible for use with a Staccato Communication™ UWB USB that includes a radiofrequency (RF) transceiver, a digital baseband, and an interface to provide for wireless connectivity up to 480 Mbps on a single chip footprint, which can be located in the display device 100, or in the host computing device 125.

In this aspect, the display device 100 may initiate a first wireless communication path with the first device and also simultaneously initiate a second wireless communication path with the second device. The first and the second communication paths may be the same or different, and may configured over a Bluetooth™ connection, or a modified Bluetooth™ connection, or another protocol. In one aspect, the communication path may be a Bluetooth™ 2.0 or 3.0 connection, an IEEE 802.11 or IEEE 802.15 wireless communication protocol, and the connection may be suitable to communicate over a number of channels simultaneously with a variable bit rate, and a variable buffer. In an alternative embodiment, the communication path may be a Bluetooth™ connection, and the connection may be suitable to communicate over all channels simultaneously with a variable bit rate, and a variable buffer.

Alternatively, the display device 100 can pair with a cell phone and a laptop computer having a wireless modem to make a call using the cell phone using the device 100, while controlling the laptop computer to play video, which is transmitted over a Bluetooth™ connection to be displayed on device 100. Various configurations are possible and within the scope of the present disclosure, and it should be appreciated that the device 100 may control three or more devices, or more by establishing more than one wireless communication link.

Figure 3:
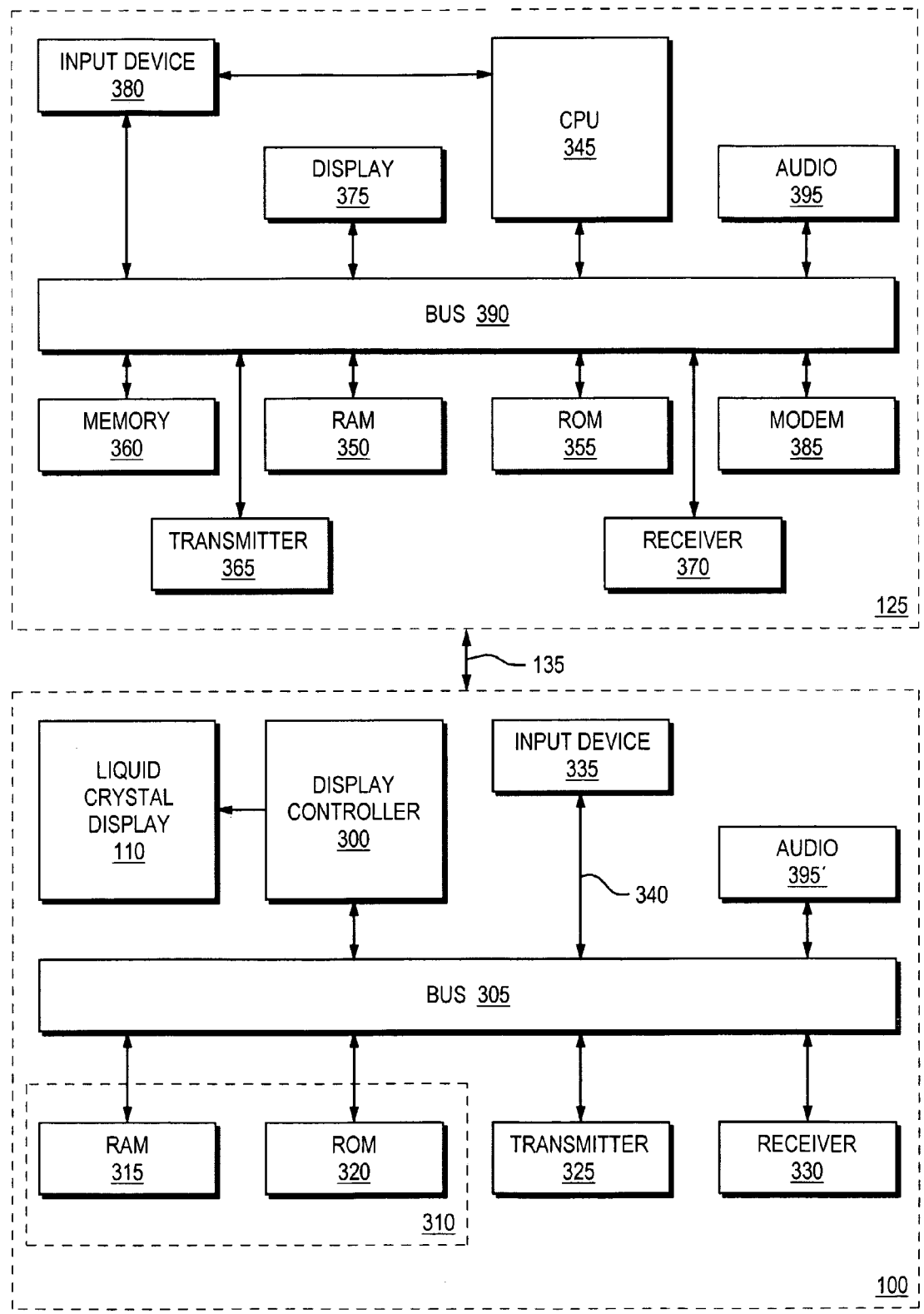
FIGS. 3-4 are block diagrams illustrating simplified schematic drawings of internal components of example embodiment monocular display devices and host computing devices adapted to wirelessly transmit data over a bidirectional communication path.

FIG. 3 illustrates a simplified block diagram of a non-limiting example embodiment of the present display device 100, for illustration purposes. The display device 100 includes a display panel 110 connected to a display controller 300, which may be a digital signal processor made by Intel™, Freescale Semiconductor™, or Advanced Micro-Devices (AMD)™, or another controller connected to a bus 305, such as a Peripheral Component Interconnect (PCI) bus. In one embodiment, the display panel 110 may be connected to a video graphics card (not shown) which is connected to the bus 305. The video graphics card can be an Accelerated Graphics Port (AGP) video card that fits to an AGP video card slot in the display device 100. The display device 100 also includes memory 310, such as a random access memory (RAM) 315 and a read only memory (ROM) 320 which saves executable program instructions, and communicates the program instructions to the controller 300 through bus 305. Preferably, the display device 100 further includes a transmitter 325 and a receiver 330, and/or a combined transceiver (not shown), both of which are connected to the bus 305 to form a wireless interface with the host computing device 125. The transmitter 325 and receiver 330 also are connected to the display controller 300 and receive instructions for control thereof.

The display device 100 also includes an input device 335 which can be a wireless mouse, trackball, or keyboard, or other similar wireless device that may be wirelessly connected to the PCI bus 305 by a wireless link 340, which is received by the receiver 330. Alternatively, the input device 335 may be connected in a wired manner (not shown) to the bus 305 to provide an input signal to the controller 300. The input device 335 may control screen prompts on the display device 100, the host computing device 125, or both the display device 100 and the host computing device 125 with the display device 100 and the host computing device 125 in a master/slave networked relationship.

The display device 100 interrogates an external or host computing device 125 and is configured to establish a wireless link 135 with the host computing device 125 such that the host computing device 125 can provide uplink and downlink data to the display device 100 in a bidirectional manner across the wireless link 135. In one embodiment, the display device 100 can receive uplink data that is suitable to display graphical multimedia information on the display panel 110 of the display device 100.

The host computing device 125 includes a central processing unit 345, a memory having a RAM 350, a ROM 355, and also including a cached memory 360. The host computing device 125 further includes a transmitter 365 and receiver 370, and/or a combined transceiver (not shown). The host computing device 125 may also include a primary display 375 and an input device 380 which are both connected to a bus 390, such as a PCI bus, as shown. It should be appreciated that the bus 390 may be connected to a wired broadband connection (not shown), or a wireless broadband connection 385, a Digital Subscriber Line (DSL) connection, a cable modem, a media player, a music or video player, or any other suitable link to receive data from a database.

During an initial stage of operation, a bi-directional wireless link 135 is established between the transmitter of the display device 325 and the receiver of the host computing device 370 and an authentication process occurs across the wireless communication path 135. Thereafter, the display device 100 can wirelessly communicate with the host computing device receiver 370 over a wireless communication link 135, and the host computing device transmitter 365 can transmit signals to the display device receiver 330. In one embodiment, the display device 100, from its transmitter 325, may wirelessly communicate with the host computing device receiver 370 using a Bluetooth™ 2.0 or 3.0 wireless radiofrequency standard. In another embodiment, the display device 100 may wirelessly communicate using a wireless UWB communication link 135, or using short-range radio frequency signals 135.

In one non-limiting embodiment, the central processing unit (CPU) 345 associated with the host computing device 125 executes program instructions and uses Microsoft Windows SideShow™ to interrogate the display device 100 to allow the display device transmitter 325 and receiver 330 to access the cached memory 360 of the host computing device 125. The contents of the cached memory 360 is then communicated to the bus 390 and to the transmitter 365. Controller 345 outputs a control signal to transmit data from the transmitter 365 to the display device 100, and to display multimedia on the display panel 110 when the host computing device 125 is off, or without power. Upon receipt by the receiver 330, the receiver 330 communicates with bus 305 to transmit the received data to display controller 300.

Display controller 300 outputs control signals to the display panel 110 to display images. This allows the display device 100 to receive data stored on the cache memory 360 of the host computing device 125. When the host computing device 125 is not in use, or switched off, the data viewed on the display device 100 is from the cached memory 360, and not updated. This data may be slightly older and not refreshed through the communication links 200a through 200e, as compared with when the host computing device 125 is operational. It should be appreciated that the display device 100 and the host computing device 125 also include audio devices 395, 395' that receive a control signal and play audio in response thereto.

Figure 4:
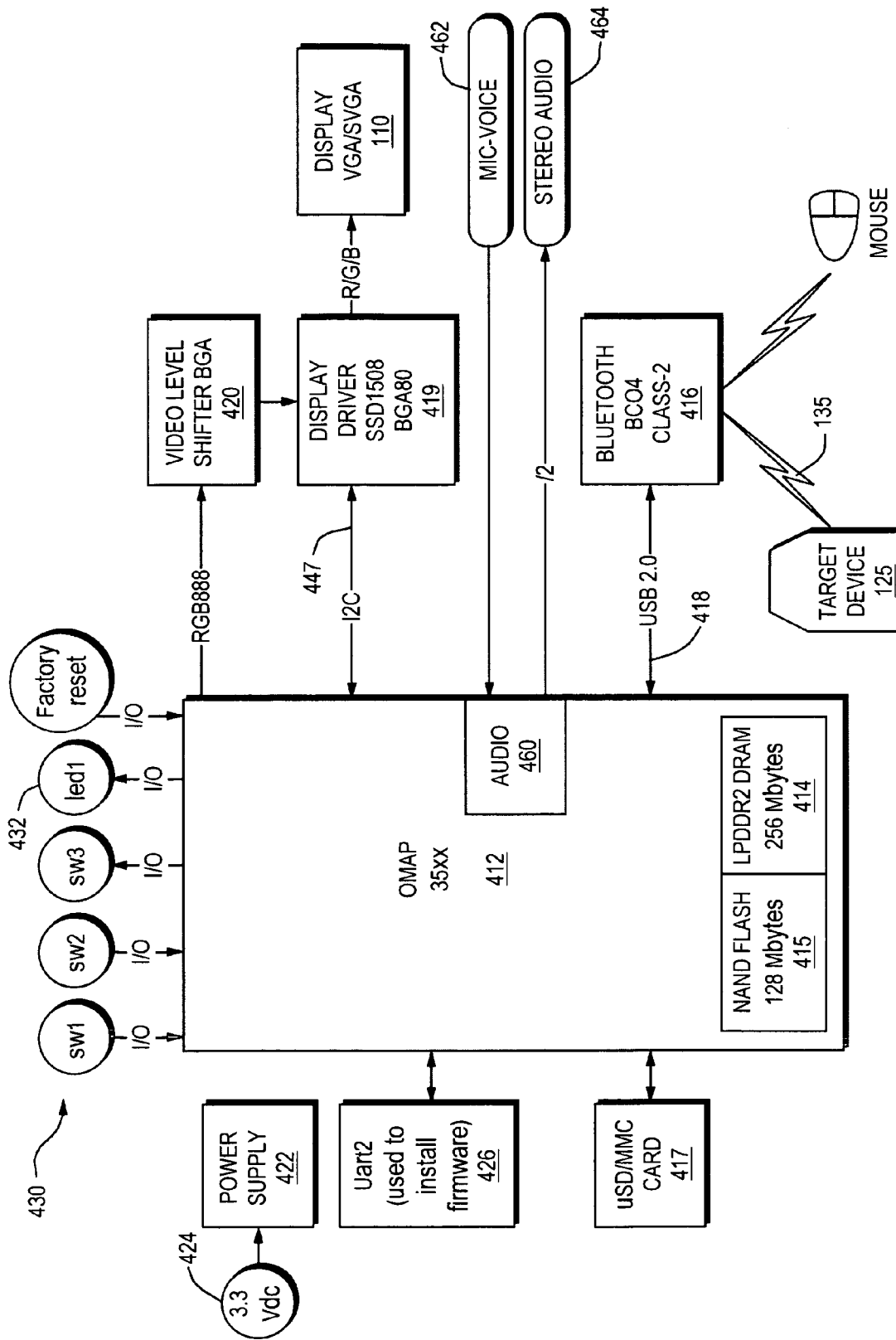

FIG. 4 provides a more detailed view of the electronic components incorporated into the display device 100, which is connected to the host computing device 125 to receive a digital video signal over a Bluetooth™ connection.

In the preferred embodiment, the display device 100 includes an Advanced Reduced instruction set computer (RISC) Machine (ARM)/Digital Signal Processor (DSP) 412 (which may be an Open Multimedia Application Platform (OMAP) 3500 series processor, available from Texas Instruments™ of Dallas, Tex.), memory 414, Bluetooth™ interface 416 which may be provided by a Class 2 Bluetooth™ interface available from Cambridge Silicon Radio™ (CSR) of Cambridge, England), display driver 419 (which may, for example, be an SSD1508 display driver available from Kopin Corporation™ of Westborough, Mass.), video level shifter circuits 420, a power supply 422 supported by a batter 424, universal asynchronous receiver/transmitter (UART) 426 (such as may be used for debugging) and memory 415. A Secure Digital (SD), eXteme Digital (xD), USB SD (uSD) memory 417 or other similar interfaces may be used to store application programs, kernel directives, or configuration data, and/or connect to devices such as a digital camera. A number of buttons 430 may be associated with the device (e.g., switch 1/switch 2/switch 3 and reset inputs) and a light-emitting diode (LED) output 432 (LED 1). A VGA or better quality display panel 110 and audio input and output device(s) 460, which may include microphone input 462 and stereo outputs 464, are also provided. The microphone 462 may receive verbal commands from a user to control the display device 100 and/or the host computing device 125.

The signal may be sent over the Bluetooth™ wireless connection established using Serial Port Profile (SPP) from the display device 100 to the host computing device 125, as opposed to using any of the "advanced" Bluetooth™ modes, which provides greater throughput higher than the higher layer protocols imposed by such advanced modes that have been found not to be needed in this application. In the Bluetooth™ radio 416, the video signal received over the Bluetooth™ connection is sent over the USB connection 418 from the interface 416 to the ARM/DSP 412.

One design consideration is to optimize data packet format, given known data buffer sizes. Internal to the CSR chip 416 is a packet buffer default size of 1000 bytes. This may be modified to force streaming video signals to use only about a 990 byte buffer size.

The processor 412 may expect the received video content to be encoded with WMV or MPEG-4 part 10 (H.264) formatting, using the so-called baseline profile or better.

In a preferred embodiment, the ARM/DSP processor 412 may use a multi-tasking embedded operating system. The processor 412 operates on the received video signal as follows. An MPEG format container file (e.g., a .MP4 file) is made available. In one preferred embodiment, this can be a proprietary file format, although the specific details of the input .MP4 file format chosen are not important here, as long as the DSP 412 is programmed to correctly process it. The processor 412 then opens a communication port to the host system 125 and receives the file over the USB™ interface 418 from the Bluetooth™ transceiver in the CSR chip 416.

An MP4 decoder in the DSP 412 strips the file into respective audio and video streams. More particularly, the DSP 412 decodes the input file H.264 compressed digital video signal into a YCbCr baseband component video signal. The ARM/DSP 412 can also divide the associated compressed audio (formatted as an Advanced Audio Coding (AAC) format signal) into baseband stereo audio.

The ARM/DSP 412 can output video in any suitable format such as an 8 bit, International Telecommunication Union Radiocommunication Sector (ITU-R) Recommendation BT. 656 or Society of Motion Picture and Television Engineers (SMPTE) 293M 16 bit YUV progressive scan with separate sync signals, to the display driver 118.

The decompressed video signal can be forwarded over an internal ARM bus of the processor 416. The ARM bus then sends the content directly to the display driver 419 via the SMPTE 293M interface. The Intelligent Interface Controller (I2C) interface 447 is used to configure the display panel 110.

The ARM 412 also outputs the baseband audio to the audio output coder-decoder (codec) module 460. It may take mono or stereo audio input and produce suitable stereo output signals.

While this invention has been particularly shown and described with references to example embodiments thereof, it will be understood by those skilled in the art that various changes in form and details may be made therein without departing from the scope of the invention encompassed by the appended claims. For example, it should be understood that the display device 100 may be any device capable of displaying video content from a host computing device 125, such as, wireless headset devices, monocular display devices, remote displays, wireless portable DVD player screens, and security system displays.

What is claimed is:

1. A method comprising:
   receiving a compressed digitally-encoded audiovisual signal of at least Video Graphic Array (VGA) quality from an external host computing device over a Serial Port Profile (SPP) Bluetooth wireless connection;
   decompressing the compressed digitally-encoded audiovisual signal; and
   generating a video signal that is suitable for handling by a display driver in a display device;
   wherein the display device is a monocular display supported on a head of a user.

2. The method of claim 1 wherein the display device is coupled to a support structure configured to support the monocular display on the head of the user.

3. The method of claim 1 wherein the compressed digitally-encoded audiovisual signal is compressed according to Windows Media Video (WMV) or Motion Picture Experts Group (MPEG)-4 part 10 (H.264) standards.

4. The method of claim 3 wherein the Bluetooth wireless connection includes at least two radiofrequency (RF) channels.

5. The method of claim 4 further comprising:
   receiving the compressed digitally-encoded audiovisual signal over a first RF channel; and
   receiving and transmitting control signals over a second RF channel.

6. The method of claim 1 further comprising forwarding the compressed digitally-encoded video signal over a high speed interface prior to decompression.

7. The method of claim 6 wherein the high speed interface is selected from a group consisting of Serial Peripheral Interface (SPI), universal asynchronous receiver/transmitter (UART) and Universal Serial Bus (USB).

8. The method of claim 6 further comprising multiplexing the compressed digitally-encoded audiovisual signal and other data over the high speed connection.

9. The method of claim 1 further comprising generating a component video signal for display.

10. The method of claim 1 further comprising reading at least one of an application program, kernel directive, or configuration data from a memory.

11. The method of claim 10 wherein the memory is a removable memory.

12. The method of claim 11 wherein the removable memory is a read only memory (ROM).

13. The method of claim 1 wherein the steps of the method are carried out in a multi-tasking embedded operating system.

14. The method of claim 1 wherein the compressed digitally-encoded audiovisual signal includes a monaural or stereo audio channel, the method further comprising generating a monaural or stereo audio output.

15. An apparatus comprising:
   a Bluetooth transceiver configured to receive a compressed digitally-encoded audiovisual signal of at least Video Graphic Array (VGA) quality from an external host computing device over a Serial Port Profile (SPP) Bluetooth wireless connection; and
   a processor configured to decompress the compressed digitally-encoded audiovisual signal and generate a video signal that is suitable for handling by a display driver in a display device;
   wherein the display device is a monocular display supported on a head of a user.

16. The apparatus of claim 15 wherein the display device is coupled to a support structure configured to support the monocular display device on the head of the user.

17. The apparatus of claim 15 wherein the compressed digitally-encoded audiovisual signal is compressed according to Windows Media Video (WMV) or Motion Picture Experts Group (MPEG)-4 part 10 (H.264) standards.

18. The apparatus of claim 17 wherein the Bluetooth wireless connection includes at least two radiofrequency (RF) channels.

19. The apparatus of claim 18 wherein the Bluetooth transceiver is further configured to receive the compressed digitally-encoded audiovisual signal over a first RF channel and receive and transmit control signals over a second RF channel.

20. The apparatus of claim 15 further comprising a high speed interface over which the compressed digitally-encoded video signal may be forwarded from the Bluetooth transceiver to the processor for decompression.

21. The apparatus of claim 20 wherein the high speed interface is selected from a group consisting of Serial Peripheral Interface (SPI), universal asynchronous receiver/transmitter (UART) and Universal Serial Bus (USB).

22. The apparatus of claim 20 wherein the compressed digitally-encoded audiovisual signal and control signals are multiplexed over the high speed connection.

23. The apparatus of claim 15 further comprising a display driver configured to generate a component video signal for display.

24. The apparatus of claim 15 further comprising memory storing at least one of an application program, kernel directive, or configuration data.

25. The apparatus of claim 24 wherein the memory is removable memory.

26. The apparatus of claim 25 wherein the removable memory is read only memory (ROM).

27. The apparatus of claim 15 wherein the processor further comprises a multi-tasking embedded operating system.

28. The apparatus of claim 15 wherein the compressed digitally-encoded audiovisual signal includes a monaural or stereo audio channel, the apparatus further comprising a coder-decoder (codec) configured to generate a monaural or stereo audio output.

29. An apparatus comprising:
  means for receiving a compressed digitally-encoded audiovisual signal of at least Video Graphic Array (VGA) quality from an external host computing device over a Serial Port Profile (SPP) Bluetooth wireless connection;
  means for decompressing the compressed digitally-encoded audiovisual signal; and
  means for generating a video signal that is suitable for handling by a display driver in a display device;
  wherein the display device is a monocular display supported on a head of a user.

30. The apparatus of claim 29, wherein the display device is coupled to a support structure configured to support the monocular display device on the head of the user.

* * * * *